US012809493B2

(12) United States Patent
Hayakawa et al.

(10) Patent No.: US 12,809,493 B2
(45) Date of Patent: Nov. 24, 2026

(54) INFORMATION PROCESSING DEVICE AND INFORMATION PROCESSING METHOD

(71) Applicant: Sony Interactive Entertainment Inc., Tokyo (JP)

(72) Inventors: Yuto Hayakawa, Tokyo (JP); Takanori Minamino, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 68 days.

(21) Appl. No.: 19/099,478

(22) PCT Filed: Aug. 7, 2023

(86) PCT No.: PCT/JP2023/028693
§ 371 (c)(1),
(2) Date: Jan. 29, 2025

(87) PCT Pub. No.: WO2024/038787
PCT Pub. Date: Feb. 22, 2024

(65) Prior Publication Data

US 2025/0315146 A1 Oct. 9, 2025

(30) Foreign Application Priority Data

Aug. 19, 2022 (JP) ................................ 2022-131085

(51) Int. Cl.
*G06T 19/00* (2011.01)
*G02B 27/01* (2006.01)
*G06F 3/04815* (2022.01)

(52) U.S. Cl.
CPC ....... *G06F 3/04815* (2013.01); *G02B 27/017* (2013.01); *G06T 19/00* (2013.01)

(58) Field of Classification Search
None
See application file for complete search history.

(56) References Cited

U.S. PATENT DOCUMENTS

2016/0124502 A1* 5/2016 Sawyer .................. G06F 3/011 345/633
2016/0171771 A1* 6/2016 Pedrotti ................. G06F 3/002 345/633

(Continued)

FOREIGN PATENT DOCUMENTS

EP 3951768 A1 2/2022
JP 2020181264 A 11/2020
JP 2020-536305 A 12/2020

OTHER PUBLICATIONS

JP2022-131085, "Notice of Decision to Grant," May 26, 2026, 5 pages.

(Continued)

*Primary Examiner* — Nicholas R Wilson
(74) *Attorney, Agent, or Firm* — Kilpatrick Townsend & Stockton LLP

(57) ABSTRACT

A play area detection section of an image generation device detects a play area based on an image captured by a stereo camera of a head mounted display, and prompts a user to discern the play area. A play area edition section receives an editing operation for drawing a new boundary for the play area, and detects an edited play area. If the size of a circumscribing rectangle exceeds an upper limit, the play area edition section trims the play area along a cut line that is perpendicular to an adjustment axis x, and determines a final play area.

11 Claims, 17 Drawing Sheets

(56) References Cited

U.S. PATENT DOCUMENTS

| | | | | |
|---|---|---|---|---|
| 2016/0253844 | A1* | 9/2016 | Petrovskaya | G06F 3/011 345/633 |
| 2017/0205892 | A1 | 7/2017 | Petrovskaya et al. | |
| 2021/0233312 | A1 | 7/2021 | Noris et al. | |
| 2025/0044592 | A1 | 2/2025 | Muramoto | |

OTHER PUBLICATIONS

International Search Report and Written Opinion mailed on Oct. 17, 2023, received for PCT Application PCT/JP2023/028693, filed on Aug. 7, 2023, 8 pages including English Translation.

EP23854821.8, "Extended European Search Report," Jul. 16, 2026, 6 pages.

* cited by examiner

INFORMATION PROCESSING DEVICE AND INFORMATION PROCESSING METHOD

CROSS-REFERENCE TO RELATED APPLICATIONS

This application is a national stage application, pursuant to 35 U.S.C. § 371, of International Patent Application No. PCT/JP2023/028693, filed Aug. 7, 2023, which claims priority to Japanese Patent Application No. 2022-131085, filed Aug. 19, 2022, the entire contents of each are incorporated herein by reference.

TECHNICAL FIELD

The present invention relates to an information processing device and an information processing method for processing data relating to a head mounted display.

BACKGROUND ART

Image display systems for allowing a user wearing a head mounted display to view a target space from a free view point have become widespread. For example, electronic content in which, to display a virtual three-dimensional space, an image corresponding to a visual direction of a user is displayed on a head mounted display to implement a virtual reality (VR) has been known. With use of a head mounted display, a feeling of immersion into an image can be enhanced, and the operability of an application of a game or the like can be improved. In addition, walk-through systems for allowing a user wearing a head mounted display and physically moving, to virtually walk around in a displayed image space, have been developed.

SUMMARY

Technical Problem

A movable range of a user wearing a head mounted display during a play of an application needs to be restricted according to the size of a room of the user and an environment including goods or furniture installed in the room of the user. However, it is difficult to set a play area so as to obtain safety and an amusement property simultaneously while taking the individual circumstances of respective users into consideration.

The present invention has been made in view of the abovementioned problem, and an object thereof is to provide a technology of easily and properly setting a play area where a user wearing a head mounted display can move.

Solution to Problem

In order to solve the abovementioned problem, a certain aspect of the present invention relates to an information processing device. The information processing device includes a storage section that stores data regarding a play area where a user wearing a head mounted display can move in a surrounding space around the user during a play of an application, a display control section that displays, on the head mounted display, an image indicating the play area stored in the storage section, and a play area edition section that receives a user operation for editing the play area, detects an excess of an upper limit of a size of the play area, and performs size adjustment by removing a portion of the play area.

Another aspect of the present invention relates to an information processing method. The information processing method includes a step of reading out, from a memory, data regarding a play area where a user wearing a head mounted display can move in a surrounding space around the user during a play of an application, a step of displaying an image indicating the play area on the head mounted display, and a step of receiving a user operation for editing the play area, detecting an excess of an upper limit of a size of the play area, and performing size adjustment by removing a portion of the play area.

It is to be noted that a system, a computer program, a recording medium having a computer program recorded in a readable manner, or a data structure, which is obtained by translating an optional combination of the above constituent elements or an expression in the present invention, is also effective as an aspect of the present invention.

Advantageous Effect of Invention

In accordance with the present invention, a play area where a user wearing a head mounted display can move can be set easily and properly.

DESCRIPTION OF EMBODIMENT

Figure 1:
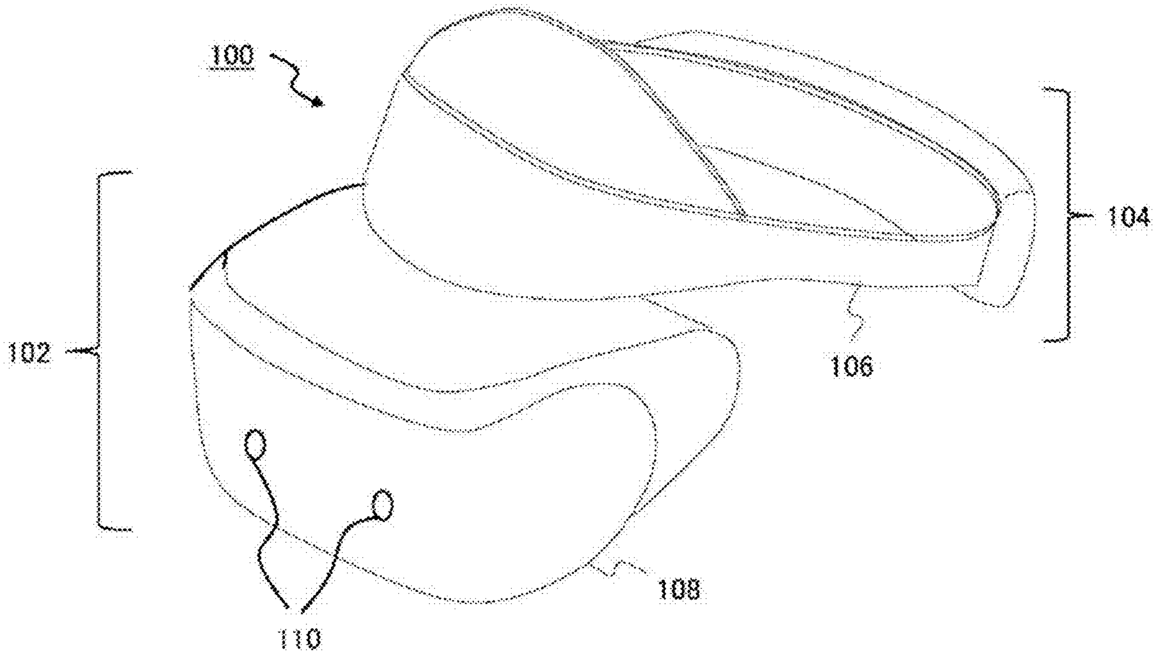
FIG. 1 is a diagram depicting an appearance example of a head mounted display according to the present embodiment.

The present embodiment relates to an image display system for displaying an application image on a head mounted display mounted on a user's head. FIG. 1 depicts an example of the appearance of a head mounted display 100. The head mounted display 100 according to the present embodiment includes an output structure part 102 and a fitting structure part 104. The fitting structure part 104 includes a fitting band 106 that surrounds a user's head when worn by a user such that the device is fixed.

The output structure part 102 includes a casing 108 that is formed to cover left and right eyes when a user is wearing the head mounted display 100. A display panel that directly faces the eyes when the user is wearing the head mounted display 100 is included in the casing 108. It is assumed that the display panel of the head mounted display 100 according to the present embodiment is not transmissive. That is, the head mounted display 100 is a non-light transmissive head mounted display.

The casing 108 may further include an ocular lens that is positioned between the display panel and the user's eyes when the user is wearing the head mounted display 100 and that enlarges the viewing angle of the user. The head mounted display 100 may further include a loudspeaker or an earphone at a position that corresponds to a user's ear when the user is wearing the head mounted display 100. In addition, the head mounted display 100 includes a motion sensor. The motion sensor detects translation movement or rotational movement of the head of the user wearing the head mounted display 100, and further, detects the position and the posture at each clock time.

The head mounted display 100 further includes a stereo camera 110 on the front surface of the casing 108. The stereo camera 110 shoots a video of a surrounding real space within a viewing field corresponding to the visual line of the user. When a captured image is displayed in real time, an unprocessed state of a real space in the facing direction of a user can be viewed as it is. That is, video see-through can be realized. Further, augmented reality (AR) can be realized by rendering a virtual object on a real object image in the captured video.

Figure 2:
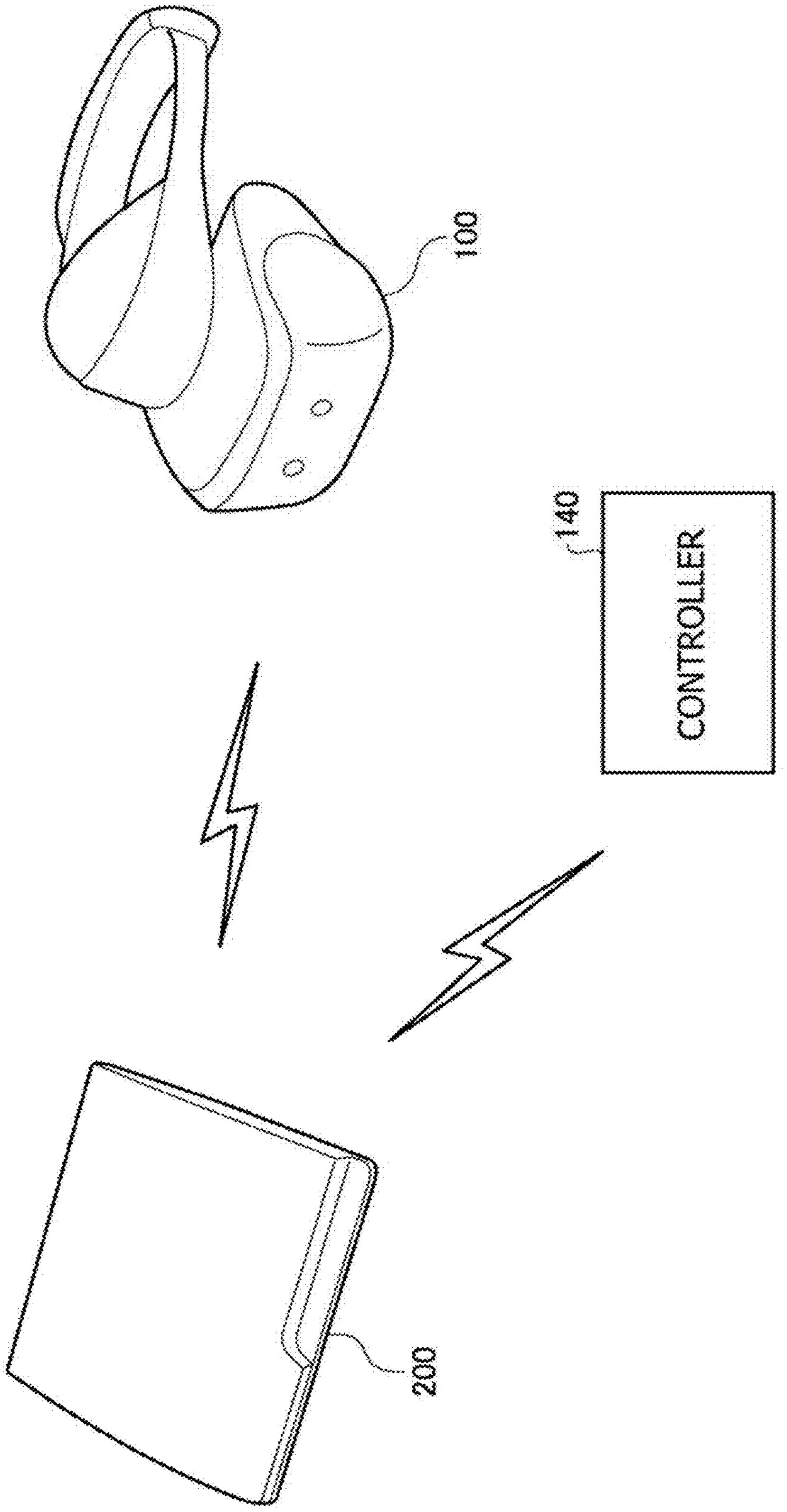
FIG. 2 is a diagram depicting a configuration example of an image display system according to the present embodiment.

FIG. 2 depicts a configuration example of an image display system according to the present embodiment. The image display system includes the head mounted display 100, an image generation device 200, and a controller 140. The head mounted display 100 is connected to the image generation device 200 by wireless communication. The image generation device 200 may be further connected to a server over a network. In this case, the server may provide data regarding an on-line application such as a game that multiple users can participate in over the network, to the image generation device 200.

The image generation device 200 is an information processing device that identifies a view point position or a visual direction on the basis of the position and the posture of the head part of a user wearing the head mounted display 100, generates a display image to indicate the viewing field corresponding to the view point position or the visual direction, and outputs the display image to the head mounted display 100. For example, the image generation device 200 may generate a display image of a virtual world where an electronic game is played while proceeding with the game, or may indicate a video to be viewed or to provide information, irrespective of which of a virtual world and a real world is indicated. In addition, in a case where a panoramic image having a wide angle of view centered on the view point of the user is displayed on the head mounted display 100, a feeling of deep immersion into the displayed image can be given to the user. It is to be noted that the image generation device 200 may be a stationary game machine, or may be a personal computer (PC).

The controller 140 (e.g. a game controller) is held by a user's hand. A user's operation for controlling image generation at the image generation device 200 or image display at the head mounted display 100 is inputted to the controller 140. The controller 140 is connected to the image generation device 200 by wireless communication. In a modification, either one of or both the head mounted display 100 and the controller 140 may be connected to the image generation device 200 by wired communication using a signal cable or the like.

Figure 3:
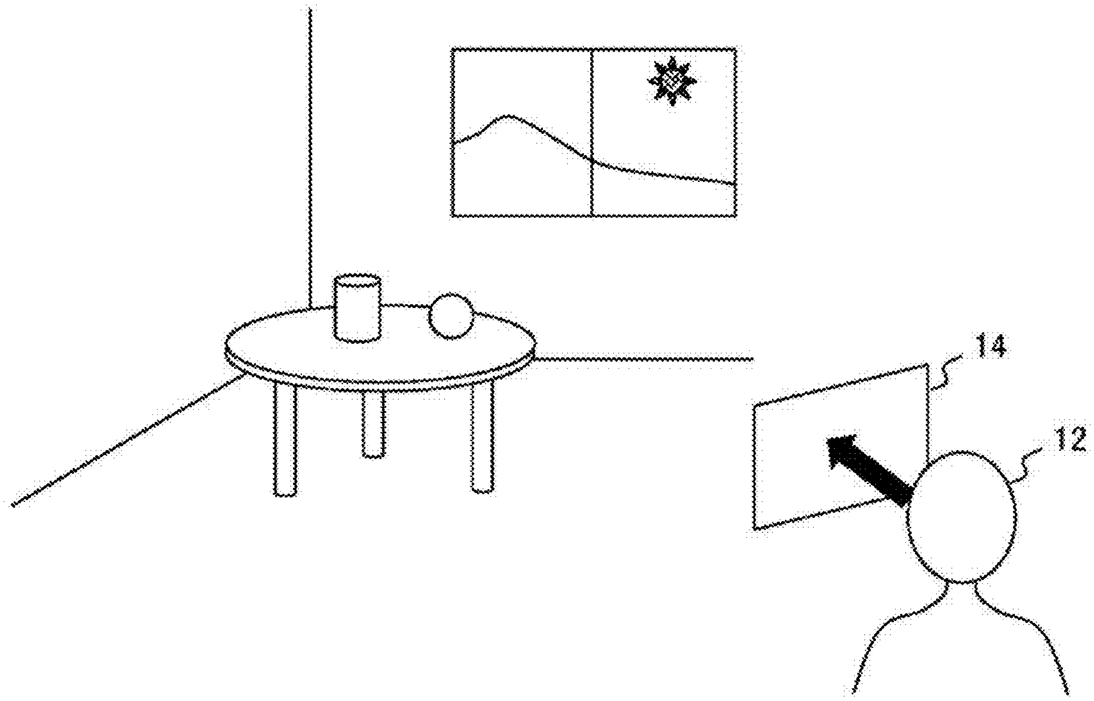
FIG. 3 is a diagram for explaining an example of an image world that an image generation device displays on the head mounted display according to the present embodiment.

FIG. 3 is a diagram for explaining an example of an image world that the image generation device 200 displays on the head mounted display 100. In this example, a situation where a user 12 is in a room which is a virtual space is created. On a world coordinate system for defining the virtual space, objects including a wall, a floor, a window, a table, and items on the table are arranged, as depicted. The image generation device 200 renders the display image by defining a view screen 14 on the world coordinate system according to the visual point position or visual direction of the user 12 and indicating the object images on the view screen 14.

The image generation device 200 acquires the visual point position or visual direction of the user 12 (hereinafter, they are collectively referred to as a "visual point" in some cases) at a prescribed rate, and changes the position and the direction of the view screen 14 according to the visual point. Accordingly, an image of a viewing field that corresponds to the visual point of the user can be displayed on the head mounted display 100. In addition, the image generation device 200 generates a stereo image having a parallax, and displays the stereo image in left and right regions of a display panel of the head mounted display 100. In this case, the user 12 can view a virtual space in stereoscopic vision. As a result, the user 12 can experience a virtual reality in which the user feels as if the user were in a room of the displayed world.

Figure 4:
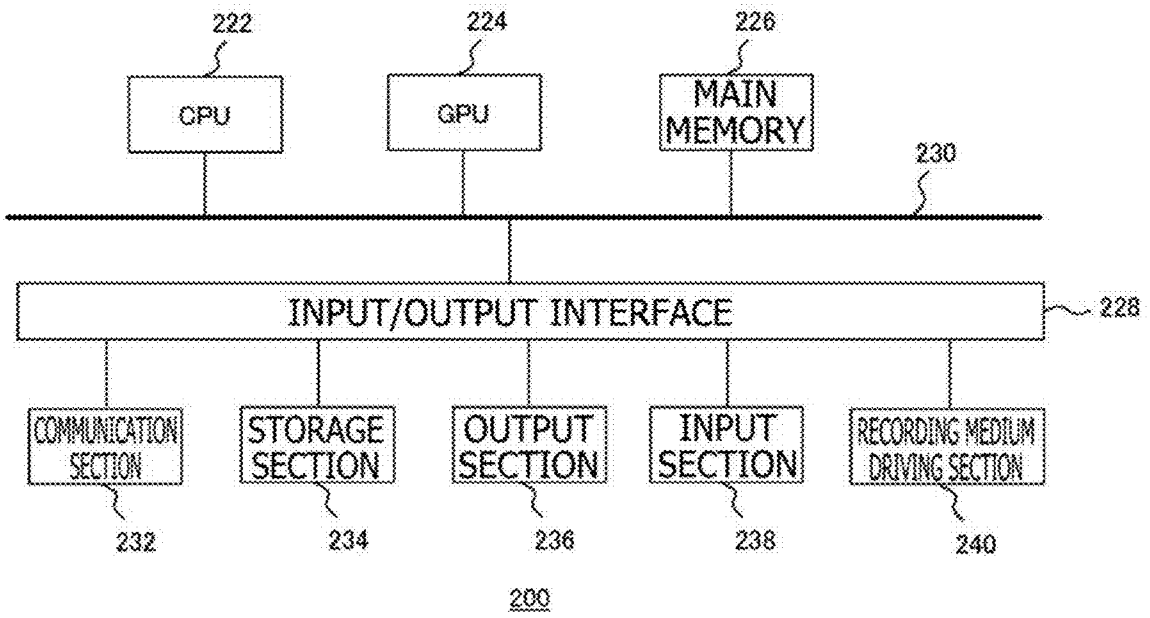
FIG. 4 is a diagram depicting an internal circuit configuration of the image generation device according to the present embodiment.

FIG. 4 is a diagram depicting an internal circuit configuration of the image generation device 200. The image generation device 200 includes a central processing unit (CPU) 222, a graphics processing unit (GPU) 224, and a main memory 226. These sections are mutually connected via a bus 230. Further, an input/output interface 228 is connected to the bus 230. A communication section 232, a storage section 234, an output section 236, an input section 238, and a recording medium driving section 240 are connected to the input/output interface 228.

The communication section 232 includes a peripheral equipment interface such as a universal serial bus (USB) or an Institute of Electrical and Electronics Engineers (IEEE) 1394 interface, and an interface for networks such as a wired local area network (LAN) or a wireless LAN. The storage unit 234 includes a hard disk drive, a nonvolatile memory, or the like. The output section 236 outputs data to the head mounted display 100. The input section 238 receives a data input from the head mounted display 100, and further, receives a data input from the controller 140. The recording medium driving section 240 drives a removable recording medium which is a magnetic disk, an optical disk, a semiconductor memory, or the like.

The CPU 222 totally controls the image generation device 200 by executing an operating system stored in the storage unit 234. Further, the CPU 222 executes programs (e.g. a VR game application, etc.) read out from the storage unit 234 or a removable storage medium and loaded into the main memory 226, or programs downloaded via the communication section 232. The GPU 224 has a geometry engine function and a rendering processor function. The GPU 224 performs rendering in accordance with a rendering command supplied from the CPU 222, and outputs a result of the rendering to the output section 236. The main memory 226 includes a random access memory (RAM), and stores programs and data that are required for processing.

Figure 5:
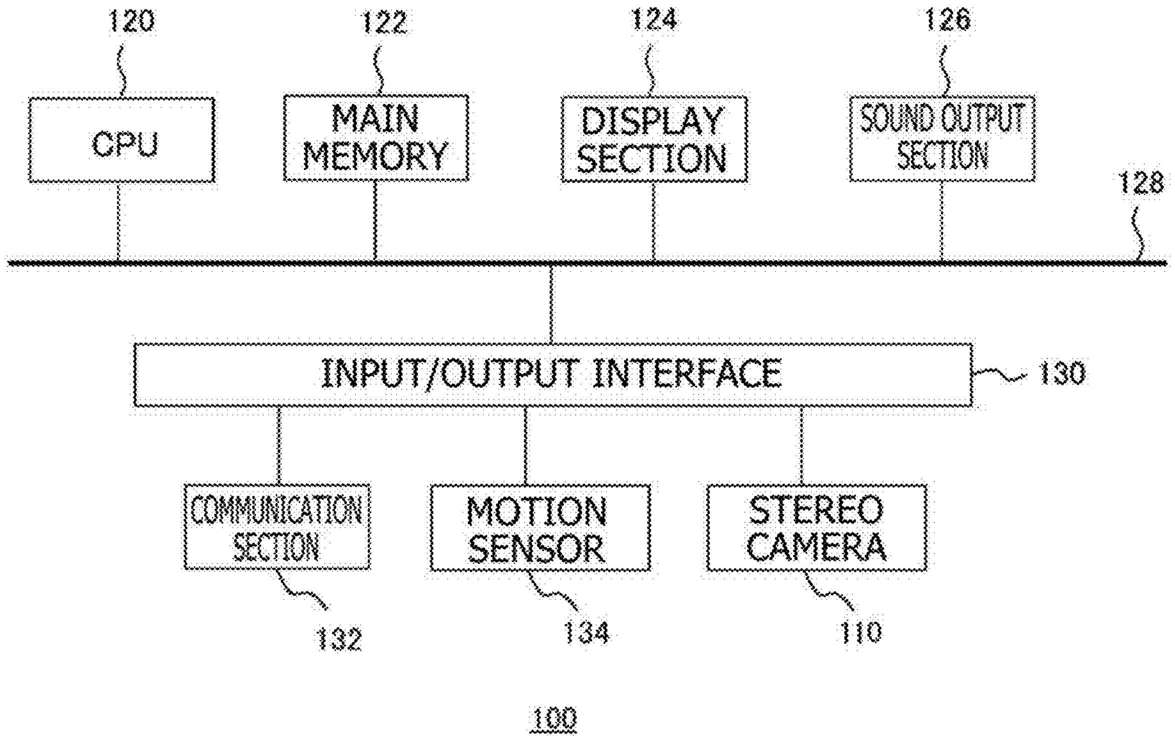
FIG. 5 is a diagram depicting an internal circuit configuration of the head mounted display according to the present embodiment.

FIG. 5 depicts an internal circuit configuration of the head mounted display 100. The head mounted display 100 includes a CPU 120, a main memory 122, a display section 124, and a sound output section 126. These sections are mutually connected via a bus 128. Further, an input/output interface 130 is connected to the bus 128. A communication section 132 equipped with a wireless communication interface, a motion sensor 134, and the stereo camera 110 are connected to the input/output interface 130.

The CPU 120 processes information acquired from the sections of the head mounted display 100 via the bus 128, and supplies a display image and sound data acquired from the image generation device 200 to the display section 124 and the sound output section 126. The main memory 122 stores programs and data that are required for processing at the CPU 120.

The display section 124 includes a display panel such as a liquid crystal panel or an organic electroluminescence (EL) panel, and displays an image before the eyes of a user who is wearing the head mounted display 100. The display section 124 may realize a stereoscopic vision by displaying a pair of stereo images in regions corresponding to left and right eyes. The display section 124 may further include a pair of lenses that are positioned between the display panel and the user's eyes when the user is wearing the head mounted display 100 and that enlarge the viewing angle of the user.

The sound output section 126 includes a loudspeaker or an earphone that is provided at a position corresponding to an ear of the user who is wearing the head mounted display 100. The sound output section 126 makes the user hear a sound. The communication section 132 is an interface for exchanging data with the image generation device 200, and performs communication by a known wireless communication technology such as Bluetooth (registered trademark). The motion sensor 134 includes a gyro sensor and an acceleration sensor, and obtains an angular velocity or an acceleration of the head mounted display 100.

As depicted in FIG. 1, the stereo camera 110 is a pair of video cameras that capture a surrounding real space from left and right viewpoints, within a viewing field corresponding to the visual point of the user. Images that are captured by the stereo camera 110 and indicate the surrounding space of the user are also referred to as "camera images." Camera images can be regarded as images each including an object that is present in the visual direction of the user (typically, the front side of the user). Measurement values obtained by the motion sensor 134 and data regarding images (camera images) captured by the stereo camera 110 are transmitted to the image generation device 200 via the communication section 132, if needed.

In the image display system according to the present embodiment, a play area that defines a real world range where a user wearing the head mounted display 100 can move during a play of an application is set. An area or range of the surrounding space of the user (real world space around the user) where the user is permitted to move around when the user is viewing a virtual reality image (hereinafter, also referred to as a "VR image") can be regarded as a play area. In a case where the user is about to come out or has come out of a play area during a play of an application, the image display system provides, to the user, an alarm for calling an attention or an alarm for prompting the user to return to the play area.

It is assumed that the abovementioned application is a game application in which VR images are displayed on the head mounted display 100. The application is also referred to as a "VR game" hereinafter. For example, the VR game may be a tennis game in which a VR image indicating a tennis court in a virtual world is displayed and the position of a character on the tennis court in the virtual world is changed according to the user's movement (e.g. walking) in a real world.

In the present embodiment, the image generation device 200 automatically detects a play area. When doing so, the image generation device 200 identifies the positions or shapes of objects in the surrounding area in the real world captured by the stereo camera 110 of the head mounted display 100, and determines a range where the user can move without coming into collision with any of the objects. Further, the image generation device 200 receives a user's operation for editing an automatically detected play area, and changes the shape of the play area according to the operation. Accordingly, the user can efficiently set a play area having an optional shape.

Figure 6:
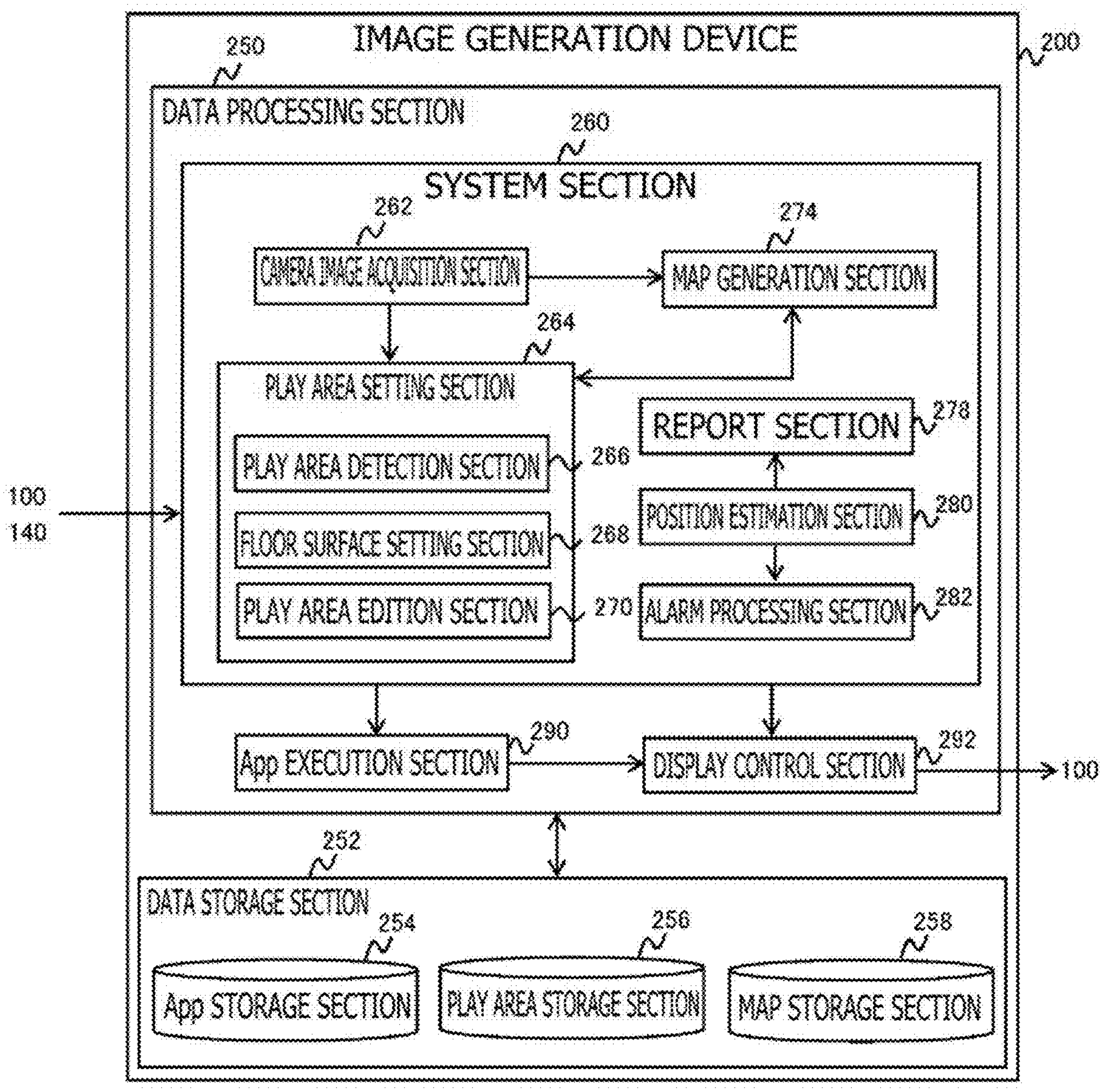
FIG. 6 is a block diagram depicting functional blocks of the image generation device according to the present embodiment.

FIG. 6 is a block diagram depicting functional blocks of the image generation device. As previously explained, the image generation device 200 executes normal information processes of proceeding a VR game and communicating with a server, for example. In particular, FIG. 6 depicts functional blocks relating to setting a play area in detail. It is to be noted that at least part of the functions of the image generation device 200 depicted in FIG. 6 may be installed in a server connected to the image generation device 200 over a network or may be installed in the head mounted display 100.

In addition, the multiple functional blocks depicted in FIG. 6 can be implemented by the CPU 222, the GPU 224, the main memory 226, the storage section 234, etc. depicted in FIG. 4, in terms of hardware, and can be implemented by a computer program having the functions of the multiple functional blocks in terms of software. Therefore, a person skilled in the art will understand that these functional blocks can be implemented in many different ways by hardware, by software, or by a combination thereof and that the functional blocks are not particularly limited.

The image generation device 200 includes a data processing section 250 and a data storage section 252. The data processing section 250 executes various types of data processing. The data processing section 250 exchanges data with the head mounted display 100 and the controller 140 via the communication section 232, the output section 236, and the input section 238 depicted in FIG. 4. The data storage section 252 stores data that is referred to or updated by the data processing section 250.

The data storage section 252 includes an App storage section 254, a play area storage section 256, and a map storage section 258. The App storage section 254 stores data regarding an application (VR game in the embodiment) for which VR images are generated. The play area storage section 256 stores data regarding a play area. The data regarding a play area includes data indicating the positions of points constituting the boundary of the play area (e.g. coordinate values of the points on the world coordinate system).

The map storage section 258 stores map data for estimating the position of the head mounted display 100 (i.e. the position of the user wearing the head mounted display 100). Map data in the present embodiment includes a set of images which are obtained by capturing a room where the user is playing a VR game (feature points included in the image), and in which a position relation (position and direction) is clear. Specifically, map data includes multiple sets each including an association among a position of the head mounted display 100, a visual direction, and a key frame. It is to be noted that map data may include any other item that is necessary to estimate what is called a self-position.

A key frame of a certain set includes data indicating a feature of an image that is viewable from the position and in the visual direction of the same set. A key frame is an image generated on the basis of a camera image captured by the stereo camera 110 of the head mounted display 100, and is an image including a prescribed number or greater of feature points. The number of feature points to be included in a key frame may be 24 or greater. Feature points may include a corner detected by a known corner detection method, or may be detected on the basis of a gradient of brightness. A key frame can be regarded as a set of partial images segmented from a camera image.

The data processing section 250 includes a system section 260, an App execution section 290, and a display control section 292. The functions of these multiple functional blocks may be installed in a computer program. The CPU 222 and the GPU 224 of the image generation device 200 may exhibit the functions of the above multiple functional blocks by reading out the computer program from the storage section 234 or a recording medium into the main memory 226 and executing the computer program.

The App execution section 290 reads out data of an application (VR game in the embodiment) selected by the user from the App storage section 254, and executes the application selected by the user. The display control section 292 sends data regarding images (e.g. VR images and AR images) generated by the system section 260 and the App execution section 290 to the head mounted display 100 such that these images are displayed on the display section 124 (display panel) of the head mounted display 100. It is to be noted that the display control section 292 may send sound data to the head mounted display 100 such that the sound data is outputted from the sound output section 126 of the head mounted display 100.

The system section 260 executes a system process concerning the head mounted display 100. The system section 260 provides a service that is common to multiple applications (e.g. VR games) for the head mounted display 100. The system section 260 includes a camera image acquisition section 262, a play area setting section 264, a map generation section 274, a report section 278, a position estimation section 280, and an alarm processing section 282.

The camera image acquisition section 262 acquires a camera image captured by the stereo camera 110 of the head mounted display 100 and sent from the head mounted display 100. The play area setting section 264 performs a variety of processes concerning setting of a play area. Specifically, the play area setting section 264 sets a pay area based on a camera image acquired by the camera image acquisition section 262 and a user's operation inputted through the controller 140. The play area setting section 264 includes a play area detection section 266, a floor surface setting section 268, and a play area edition section 270.

The play area detection section 266 automatically detects a play area from the surrounding space around the user wearing the head mounted display 100, on the basis of the camera image acquired by the camera image acquisition section 262. The floor surface setting section 268 receives a user's operation for editing the height of a floor surface detected as a play area by the play area detection section 266, and changes the height of the floor surface according to the operation.

The play area edition section 270 receives a user's operation for editing a play area automatically detected by the play area detection section 266, and changes the shape of the play area according to the operation. For example, according to the user's operation, the play area edition section 270 reduces or extends a play area automatically detected by the play area detection section 266.

In parallel with detection of a play area by the play area detection section 266, the map generation section 274 generates a map for estimating the position of the user, on the basis of the camera image acquired by the camera image acquisition section 262. The map generation section 274 stores the generated map data in the map storage section 258. In a case where a predetermined number or more of camera images obtained by capturing the surrounding space around the user from multiple directions are inputted, the map generation section 274 quits the map generation.

The report section 278 reports information that is necessary for the App execution section 290 to execute a VR game, to the App execution section 290. The position estimation section 280 estimates the position of the user in the real world on the basis of the map data stored in the map storage section 258 and the camera image acquired by the camera image acquisition section 262. In other words, the position estimation section 280 estimates the position of the user in the play area.

For example, the position estimation section 280 may collate multiple key frames included in the map data with the camera images, and may estimate the position of the user on the basis of positions of the head mounted display 100 and visual directions associated with the respective key frames. Alternatively, the position estimation section 280 may estimate the position of the user by a known self-position estimating technology such as simultaneous localization and mapping (SLAM). The alarm processing section 282 performs an alarm process to the user according to the relation between the boundary of the play area and the position of the user.

Figure 7:
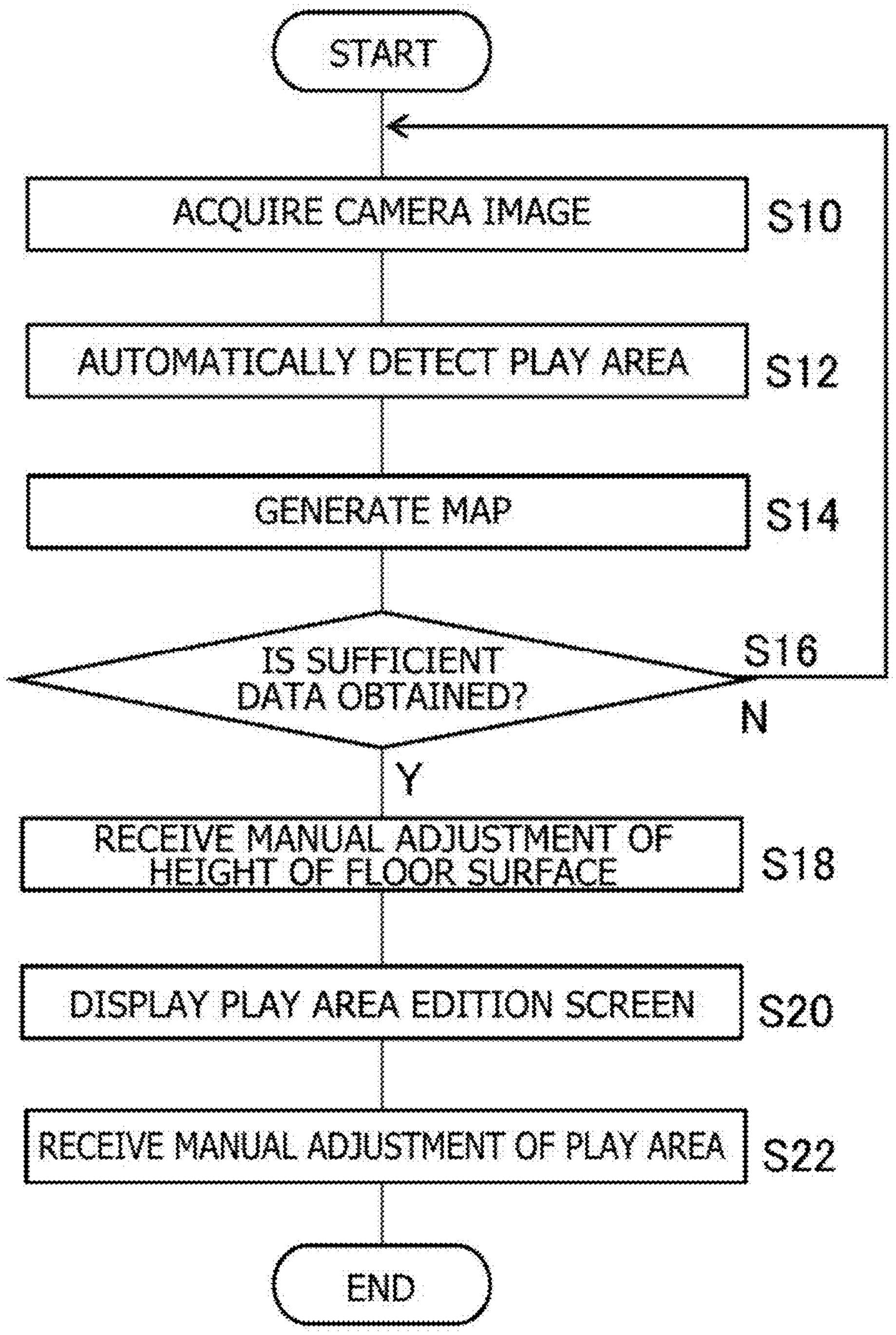
FIG. 7 is a flowchart of operation of the image generation device for setting a play area in the present embodiment.

Next, operation of the image display system that can be realized by the abovementioned configuration will be explained. FIG. 7 is a flowchart of operation of the image generation device 200 for setting a play area. The user can select a play-area initial setting or resetting from a setting menu in a system of the head mounted display 100. When a play-area initial setting or resetting is selected, the play area setting section 264 of the image generation device 200 displays a message for prompting the user to look around on the head mounted display 100 via the display control section 292.

When the user with the head mounted display 100 mounted on the head moves while looking around in response to the message, the head mounted display 100 sequentially sends data regarding multiple camera images to the image generation device 200. Each piece of the data regarding the camera images includes sensor data obtained when the corresponding camera image is generated. The sensor data includes a measurement value obtained by the motion sensor 134. Examples of the measurement value include an angular velocity and an acceleration of the head mounted display 100. The camera image acquisition section 262 of the image generation device 200 acquires data regarding a camera image sent from the head mounted display 100 (S10).

The play area detection section 266 of the image generation device 200 automatically detects a play area in the surrounding area around the user on the basis of the camera image acquired in S10 (S12). Specifically, the play area detection section 266 may estimate the three-dimensional shape of the user's room by a known method on the basis of the camera images and the sensor data corresponding to the camera images. The play area detection section 266 may detect a flat surface (typically, a floor surface) that is perpendicular to the direction of gravity indicated by the sensor data regarding the basis of the estimated three-dimensional shape of the room, and detect, as a play area, a synthesis result of the multiple detected flat surfaces at the same height. The play area detection section 266 stores, in the play area storage section 256, play area data including the coordinate values of points constituting the boundary of the play area.

When detecting a play area, the play area detection section 266 detects the height of the floor surface as the play area. The height of the floor surface may be the distance between the floor surface and the head mounted display 100 in the direction of gravity, for example. The play area detection section 266 stores data indicating the height of the floor surface in the play area storage section 256. In a case where the position of the head mounted display 100 is in the point of origin, the height of the floor surface may be −1 meter, for example.

In parallel with S12, the map generation section 274 of the image generation device 200 generates a map for estimating the position of the user, on the basis of the camera image acquired in S10 (S14). Until a prescribed condition that indicates that map data sufficient to estimate the position of the user has been obtained is satisfied, the play area detection section 266 and the map generation section 274 repeat S12 and S14 using new camera images (N in S16). After sufficient map data is obtained, the play area detection section 266 quits the play area detection, and the map generation section 274 quits the map generation (Y in S16).

Next, the floor surface setting section 268 of the image generation device 200 generates a floor surface adjustment screen based on data indicating the height of the floor surface stored in the play area storage section 256. The floor surface adjustment screen may include an AR image obtained by superimposing an object representing the floor surface (e.g. a translucent lattice object) on a camera image acquired by the camera image acquisition section 262. The floor surface setting section 268 displays the floor surface adjustment screen on the display panel of the head mounted display 100 via the display control section 292. The floor surface setting section 268 receives a user's operation for adjusting the height of the floor surface inputted to the floor surface adjustment screen, and changes the height of the floor surface according to the user's operation. The floor surface setting section 268 stores data indicating the changed height of the floor surface in the play area storage section 256 (S18).

Subsequently, the play area edition section 270 of the image generation device 200 generates an image indicating the play area automatically detected by the play area detection section 266. Specifically, the play area edition section 270 generates a play area edition screen based on the data regarding the play area stored in the play area storage section 256. The play area edition screen includes an AR image obtained by superimposing an object representing the play area on the camera image acquired by the camera image acquisition section 262. The display control section 292 of the image generation device 200 displays the play area edition screen on the display panel of the head mounted display 100 (S20).

The play area edition section 270 receives a user's operation for editing the play area inputted through the play area edition screen (S22). Specifically, the play area edition section 270 changes the shape of the play area according to the user's operation, that is, expands or reduces the play area according to the user's operation. By storing data regarding the play area having the changed shape (e.g. the coordinate values of points constituting the boundary) in the play area storage section 256, the play area edition section 270 updates the data regarding the play area stored in the play area storage section 256.

Figure 8:
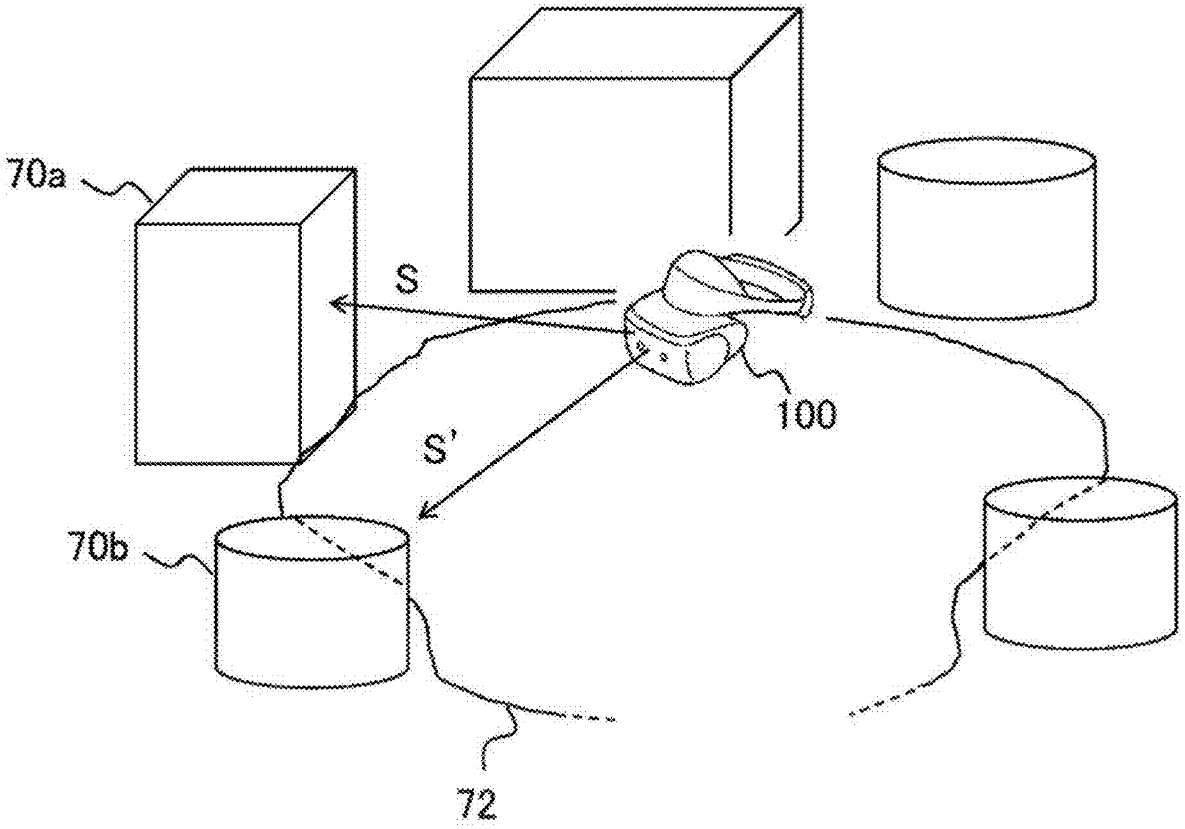
FIG. 8 is a diagram for explaining a method of detecting a play area by means of a play area detection section according to the present embodiment.

FIG. 8 is a diagram for explaining a method of detecting a play area by means of the play area detection section 266. The play area detection section 266 basically identifies the presence of an object by detecting a surface that is substantially perpendicular to the floor surface on the map generated by the map generation section 274. In the depicted example, as the user wearing the head mounted display 100 looks around, the three-dimensional position coordinates of feature points of an obstacle (e.g. an obstacle 70*a* or 70*b*) captured in the visual direction (e.g. a direction S or S') are gradually identified.

As a result, a region in the real space where the presence of the obstacle is identified is expanded, and at the same time, the play area detection section 266 sets a boundary 72 for a play area, in front of the detected obstacle, for example. Until it is determined in S16 in FIG. 7 that sufficient map data has been obtained, the play area detection section 266 updates the boundary 72 for the play area as appropriate each time a new obstacle is detected. When it is determined that sufficient map data has been obtained as a result of completion of, for example, looking around 360 degrees, the play area detection section 266 determines the current play area as a provisional play area.

Figure 9:
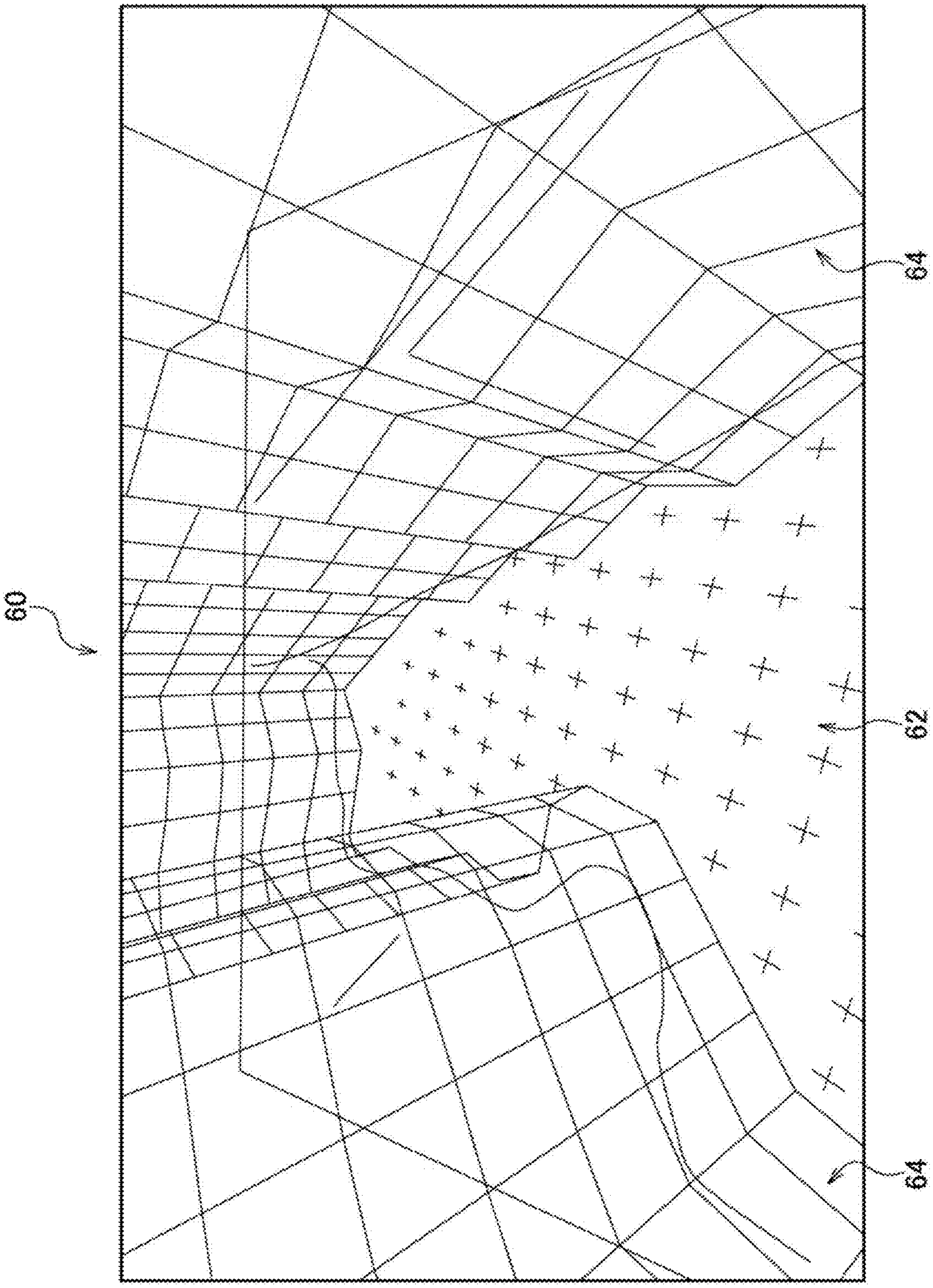
FIG. 9 is a diagram depicting a play area image which is displayed in S20 of FIG. 7.

FIG. 9 depicts a play area image which is displayed in S20 of FIG. 7. A play area image 60 includes a play area part 62 and a boundary part 64. The play area part 62 may indicate a play area (which is typically a floor surface on which no obstacle is disposed). For example, the play area part 62 may be an image indicating a translucent latticed object. The boundary part 64 is an image indicating a boundary surface of the play area, and indicates a surface that orthogonally intersects, at the boundary of the play area, with the play area. Also, the boundary part 64 may be a translucent latticed object, for example.

Figure 10:
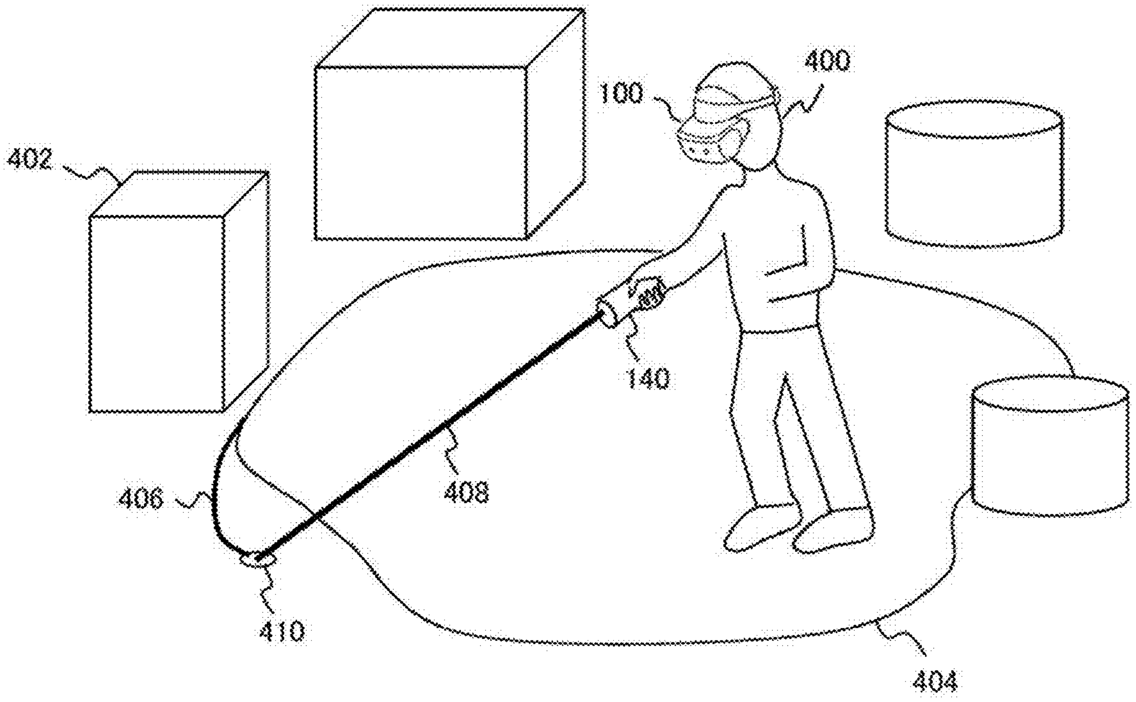
FIG. 10 is a diagram schematically depicting how a user edits a play area in the present embodiment.

FIG. 10 schematically depicts the user editing a play area. The play area edition section 270 displays, on the head mounted display 100, an AR image obtained by superimposing, on a camera image, an object representing a play area such as the play area part 62 depicted in FIG. 9. That is, an object 404 which is a play area provisionally determined on a floor surface surrounded with real objects (e.g. a real object 402) by the play area detection section 266 is viewable to the user 400.

By using the controller 140, the user 400 optionally corrects the boundary of the original play area by drawing a new virtual line 406 on the floor surface. For example, the play area edition section 270 causes the controller 140 to emit a virtual beam 408 and indicate an AR image representing an object of a controller cursor 410 in the reach point of the beam on the floor surface. In accordance with the controller 140 being moved like a laser pointer by the user, the play area edition section 270 moves the controller cursor 410 and represents the movement path as a line 406. Accordingly, the user can obtain the feeling of drawing a line on the floor.

Figure 11:
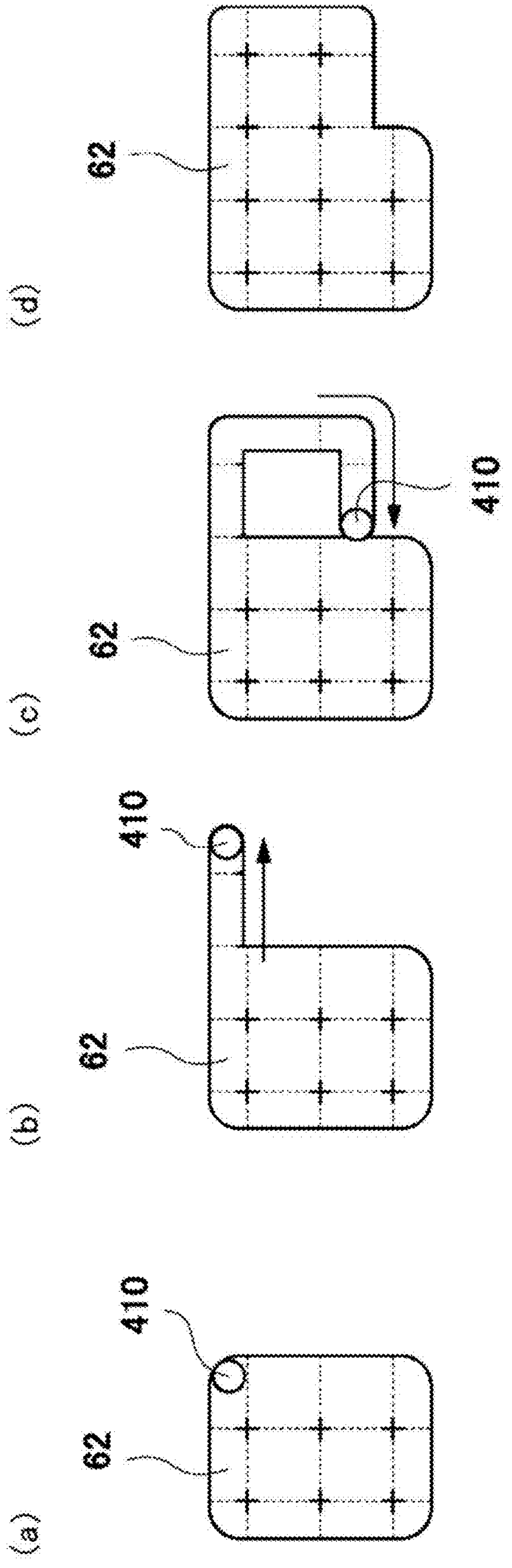
FIG. 11 is a diagram illustrating movement of a controller cursor and change of a play area in the present embodiment.

FIG. 11 illustrates movement of a controller cursor and change of a play area. FIG. 11 provides overhead views of the play area part 62 at respective stages of an editing period. As depicted in (a) to (c), a user moves the controller cursor 410 on the floor surface, and, as a line representing the movement path, a line that comes out of the play area part 62 and then comes into the play area part 62 is drawn, for example. In this case, the play area edition section 270 adds a region surrounded by the drawn line to the play area part 62, as depicted in (d). In this case, the user draws, as a result, a new boundary for the play area by moving the controller cursor 410 on the floor surface.

Accordingly, the play area edition section 270 generates data regarding a new play area including the added region, and updates the original data stored in the play area storage section 256. It is to be noted that, to reduce the play area, the play area edition section 270 receives an operation for drawing a line for dividing the original play area part 62. In this case, the play area edition section 270 determines, as a new play area, one of the divided play area parts 62 where the user is present.

The play area edition section 270 receives an operation for editing a play area, as depicted in the drawing, not only when the play area detection section 266 automatically detects the play area but also when the play area determined by an editing operation is to be changed at a later timing. Therefore, the degree of freedom of setting a play area can be increased.

On the other hand, if a play area can be extended without limitation in a large space where there is no obstacle, the following problems may arise. Specifically, in a case where the image generation device 200 and the head mounted display 100 are connected via a cable, a long cable is required, and this may hinder the user's movement. There is a risk that the cable may twine around the body or may cause the user to trip thereon. Even in a case where the image generation device 200 and the head mounted display 100 are wirelessly connected, a communication state may become unstable depending on the position of the user.

In addition, an amount of computation for tracking a user motion may become huge, or the accuracy of tracking may be deteriorated, whereby a display delay and degradation of the content processing accuracy are likely to occur. Therefore, an upper limit is set for the size of a play area in the present embodiment. For example, a 5×5-meter rectangle is defined as the upper limit of a play area. In a case where the user sets a play area exceeding the upper limit by performing a play area editing operation, the play area edition section 270 detects the setting, and performs size adjustment under the upper limit by trimming the edited play area. Accordingly, time for performing an editing operation again can be saved.

Figure 12:
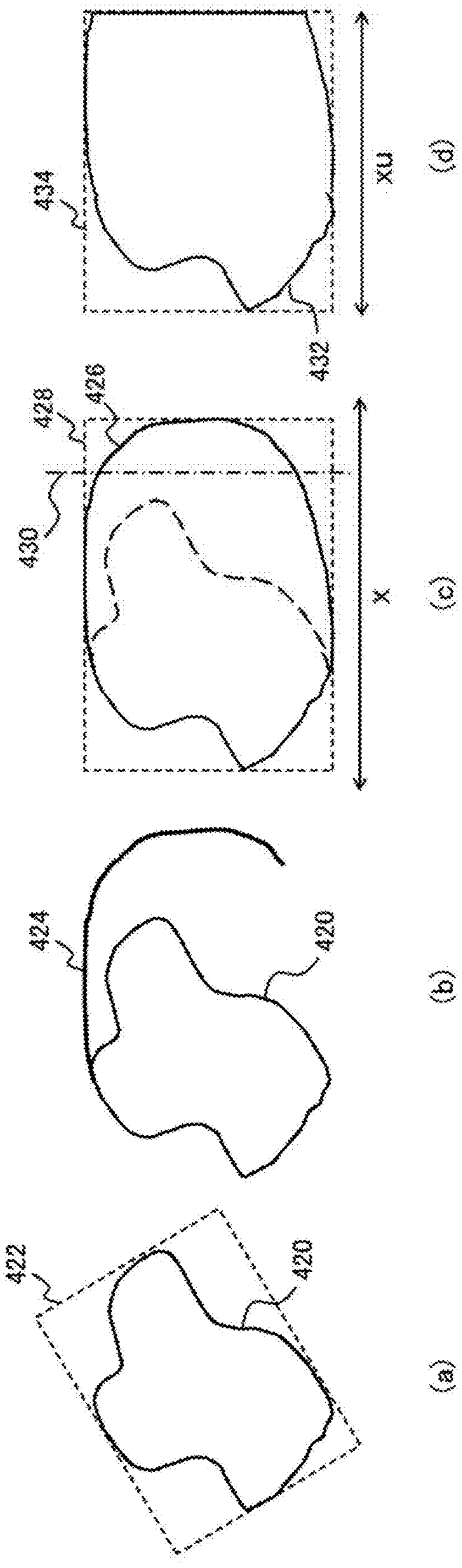
FIG. 12 is a diagram illustrating a manner in which the play area edition section adjusts the size of a play area edited by a user in the present embodiment.

FIG. 12 illustrates a manner in which the play area edition section 270 adjusts the size of a play area edited by a user. FIG. 12 provides overhead views of a play area (or an object of the play area) at respective stages of an editing period. In FIG. 12, (a) indicates an initial state in which every side of a circumscribing rectangle 422 of a play area 420 is within the upper limit. (b) indicates a state in which the user is performing an editing operation and a controller cursor is being moved to draw a new boundary 424 for the original play area 420.

(c) indicates a state in which the controller cursor is inside the original play area 420. Thus, the play area edition section 270 recognizes a new play area 426 which includes a region inside the drawn boundary. It is to be noted that the play area edition section 270 may recognize, as the start and end of boundary drawing, a timing at which the user starts depressing a trigger button of the controller 140 and a timing at which the user stops depressing the trigger button. That is, the play area edition section 270 may enable boundary drawing with the trigger button depressed.

After the user stops the drawing in (c), the play area edition section 270 virtually generates a circumscribing rectangle 428 of the new play area 426, and determines whether or not the size of the circumscribing rectangle 428 exceeds the upper limit. When the size of the circumscribing rectangle 428 exceeds the upper limit or when at least one side of the circumscribing rectangle 428 exceeds the upper limit, the play area edition section 270 sets a cut line 430 for removing the oversized portion, and then trims the new play area 426.

Here, the cut line 430 is perpendicular to sides (two opposite sides) of the circumscribing rectangle 428 exceeding the upper limit. It is to be noted that, hereinafter, an axis x that is parallel with the sides of the circumscribing rectangle 428 exceeding the upper limit is referred to as an "adjustment axis." The adjustment axis in FIG. 12 is set in one direction only, but, in a case where both adjacent sides of the circumscribing rectangle 428 exceed the upper limit, two axes that are perpendicular to each other are set as the adjustment axes. (d) depicts a play area 432 having undergone the trimming along the cut line 430. Since the cut line 430 is properly set, a circumscribing rectangle 434 falls under the upper limit.

The cut line 430 is set in such a way that the length of the sides of the circumscribing rectangle 434 along the adjustment axis direction becomes equal to an upper limit xu. If so, a play area that has the maximum size in a direction to which extension is desired by the user can be set. It is to be noted that the size of a play area may be confirmed using a circumscribing polygon, circle, or ellipse in place of the circumscribing rectangle. Further, the cut line may be set in an optional direction with respect to the adjustment axis, and a bent line or a curved line may be adopted as the cut line. However, according to the setting depicted in the drawing, a play area can be quickly adjusted by easy calculation.

Figure 13:
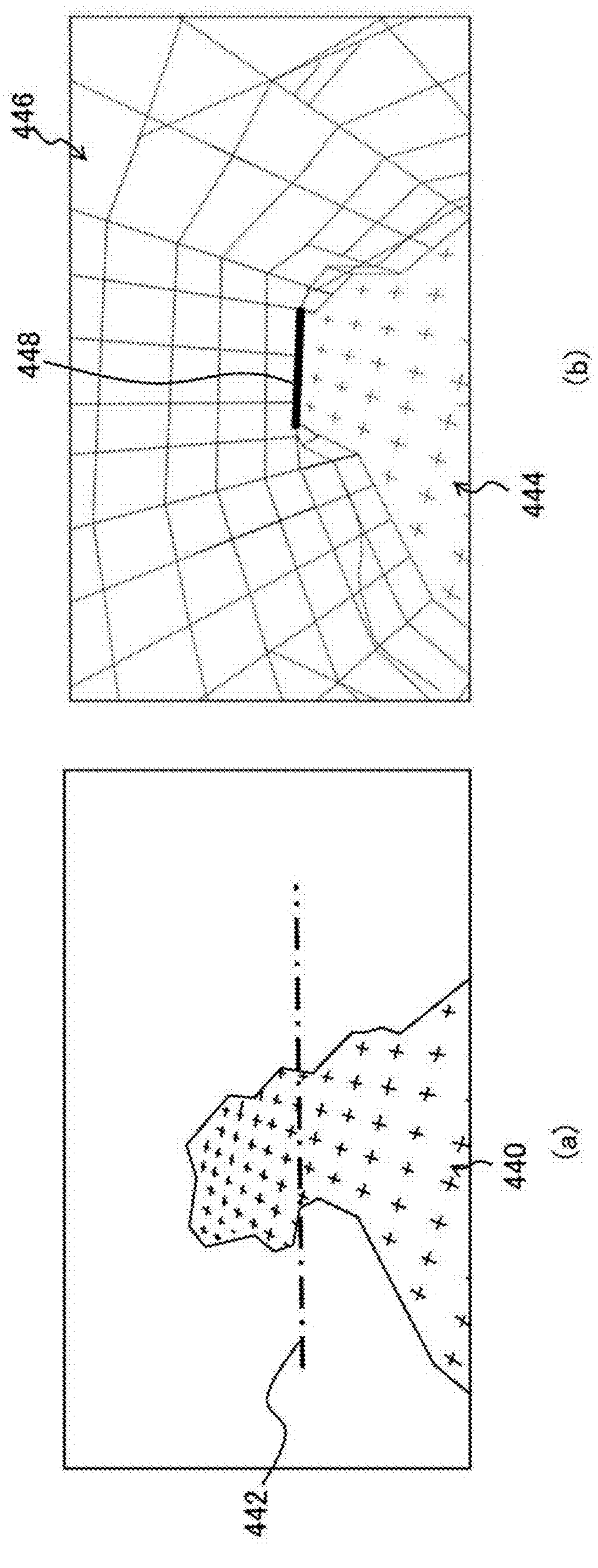
FIG. 13 is a diagram illustrating images that the play area edition section displays on the head mounted display during a play area editing period in the present embodiment.

FIG. 13 illustrates images that the play area edition section 270 displays on the head mounted display 100 during a play area editing period. (a) is an example of an image immediately after a user draws a new boundary for a play area by using the controller 140. An object 440 of the play area is illustrated. The object 440 of the play area is actually superimposed on the corresponding floor surface region image included in a camera image.

For example, while viewing a camera image and a controller cursor displayed on the head mounted display 100, a user moves the controller cursor that has been moved from the front left side to the rear side by using the controller 140, toward the front right side. The play area edition section 270 recognizes the movement path of the controller cursor as a new boundary, and fills the region inside the boundary with an object of the play area. Accordingly, the depicted object 440 is indicated.

When recognizing the end of drawing or recognizing, for example, that the user releases the trigger button of the controller 140, the play area edition section 270 confirms the size of the circumscribing rectangle, as depicted in (c) of FIG. 12. When the size exceeds the upper limit, the play area edition section 270 sets a cut line that is perpendicular to an adjustment axis, and then trims the play area. A set cut line 442 is indicated according to the object 440 of the play area in the drawing for explanation, but does not need to be actually displayed.

Then, the play area edition section 270 represents the remaining play area from which a region outside the cut line 442 has been removed and the boundary surface of the remaining play area in the form of an object of a play area part 444 and an object of a boundary part 446, as depicted in (b). In actuality, the play area part 444 and the boundary part 446 are superimposed on the camera image. As a result of the depicted image change, the user can discern that the boundary drawn by the user exceeds the upper limit size of the play area.

On the other hand, the play area edition section 270 may more clearly indicate that the play area has been trimmed. For example, the play area edition section 270 may display a portion 448, of the play area part 444, overlapping the cut line or the boundary part 446 thereabove in a different color from that of the other portions. Alternatively, during a transition from (a) to (b), the play area edition section 270 may display an animation indicating how a portion of the play area is removed, or the removed portion may be left, in the (b) image, in the form of an object that is more transparent than the play area part 444.

In addition, at a timing of trimming the play area, the play area edition section 270 may make the user hear a prescribed alarm sound via the display control section 292 and the head mounted display 100. In any case, since the trimming is specified in this manner, the user can easily discern that the size has been adjusted because the drawn boundary exceeds the upper limit. Alternatively, at the stage where the user is drawing the boundary, the play area edition section 270 may constantly monitor an excess of the size of the play area, and give a report to the user at a timing of the excess.

Figure 14:
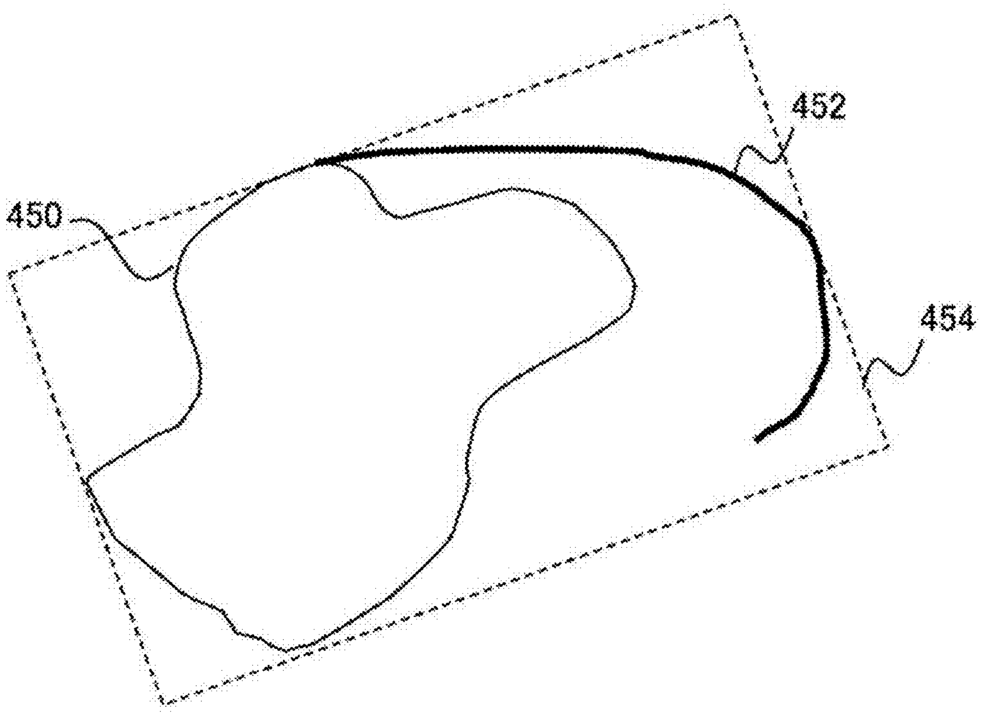
FIG. 14 is a diagram for explaining an aspect in which, while a user is drawing a boundary for a play area, the play area edition section monitors an excess of the size of the play area.

FIG. 14 is a diagram for explaining an aspect in which, while a user is drawing a boundary for a play area, the play area edition section 270 monitors an excess of the size of the play area. It is assumed that the user is drawing a new boundary 452 for an original play area 450 by using the controller 140. Here, the play area edition section 270 generates a circumscribing rectangle 454 for the original play area 450 and the boundary 452 at a prescribed rate. That is, as the boundary 452 is extended, the circumscribing rectangle 454 may also be updated accordingly.

Then, when the size of the circumscribing rectangle 454 exceeds the upper limit or the length of at least one of the sides thereof exceeds the upper limit, the play area edition section 270 gives a report to the user. For example, the play area edition section 270 may make the user hear a prescribed alarm sound via the display control section 292 and the head mounted display 100. Alternatively, the play area edition section 270 may display the boundary of the upper-limit exceeding portion in a different color from that of the other portion, or may cause vibration of the controller 140. As a result of the report, the user can easily address the excess by, for example, changing the direction of the boundary being drawn.

In the example in FIG. 12, a region added by the user's drawing of a boundary is exclusively a target to be removed. In this case, removal of a part of the play area can be indicated in the main visual direction of the user, as depicted in FIG. 13, so that the user can intuitively discern the removal. On the other hand, in a case where, for example, the size of the original play area is close to the upper limit, there may be no room for extension of the play area in a direction to which the user desires to add a region. In this case, if a region to be removed is restricted only to a region added by the user, the added region may be entirely removed, and the play area may remain unchanged. Taking such a case into consideration, it is not necessary to restrict a region to be removed by the play area edition section 270 to a region added by the user.

Figure 15:
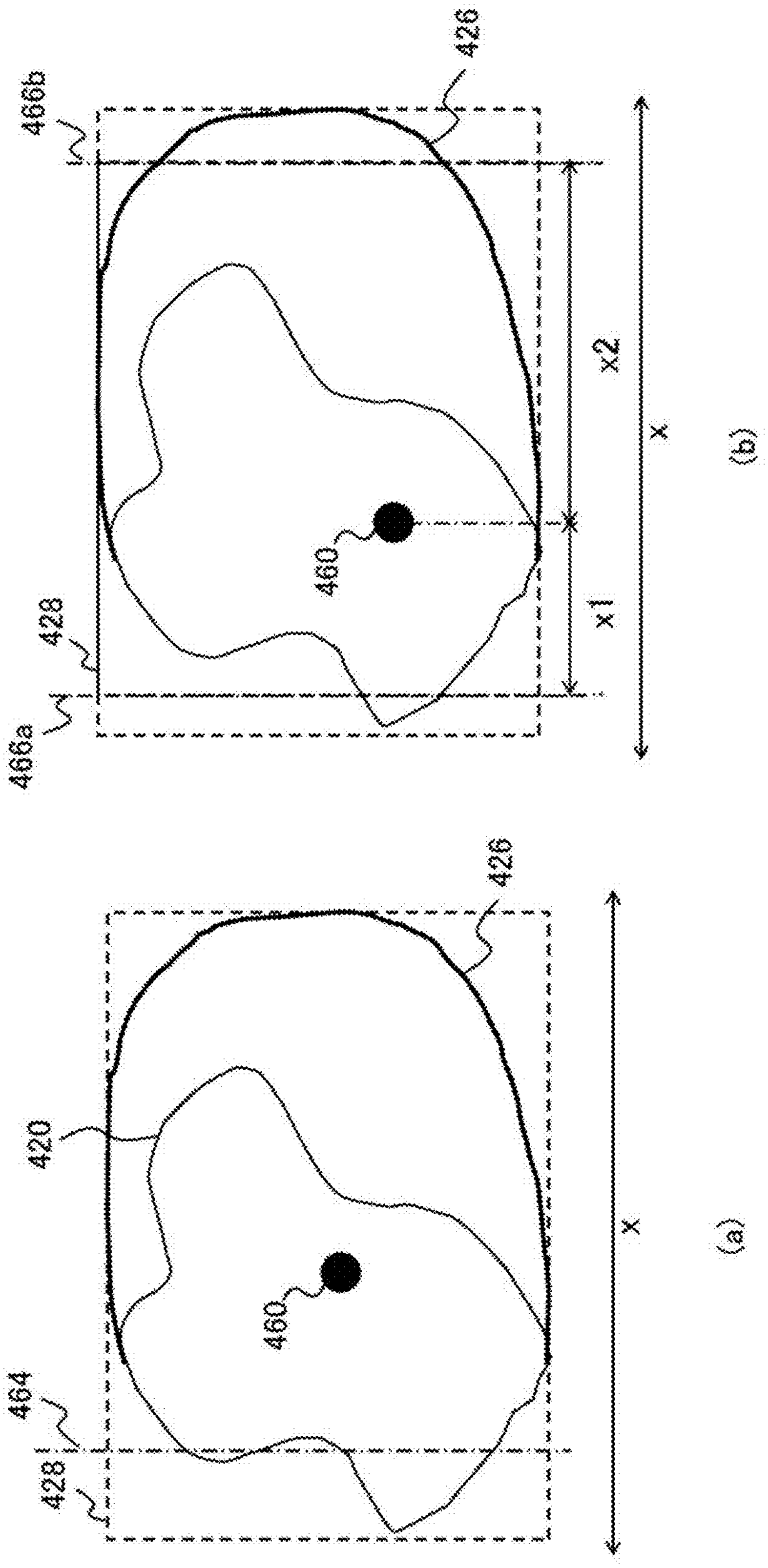
FIG. 15 is a diagram for explaining an aspect in which the play area edition section removes a region of a new play area excluding a region added by the user in the present embodiment.

FIG. 15 is a diagram for explaining an aspect in which the play area edition section 270 removes a region of a new play area excluding a region added by a user. As in FIG. 12, (a) indicates a state in which the user draws a boundary for the original play area 420 and the play area edition section 270 generates the circumscribing rectangle 428 for the new play area 426. It is to be noted that the user is assumed to be in a position 460 inside the play area. In this example, the play area edition section 270 sets the cut line 464 to remove a play area on a side opposite to the region added by the user with respect to the adjustment axis x.

Accordingly, even if the size of the play area is close to the upper limit, the play area is shifted to a direction in which the user desires to add a region, so that the user's intention is easily reflected. In this case, however, the possibility that a region to be removed is outside the user's viewing field is increased. As a result, without realizing, the user may be at an end of the play area or outside the play area.

Therefore, the play area edition section 270 may determine a cut line in such a way that the distance between the user position 460 and the boundary of the play area is kept to a prescribed value or greater, as depicted in (b). That is, the play area edition section 270 sets a cut line in a position where each of the distances x1 and x2 from the user position 460 with respect to the adjustment axis x is equal to or greater than a prescribed value. In the depicted example, two cut lines 466*a* and 466*b* are set on both sides of the play area with respect to the adjustment axis x.

It is to be noted that the lower limits for the distances x1 and x2 may differ between the side to which the user has added the region and the opposite side. In addition, in a case where, as depicted in (a), removal is preferentially performed on the side to which the user has not added the region and the distance x1 between the cut line and the user is less than the lower limit, a portion may be removed, by the remaining amount to be removed, from the side to which the user has added the region. Alternatively, the priority order may be reversed. In this manner, it can be ensured that the user is inside the play area, irrespective of which region is preferentially removed with respect to the adjustment axis.

Figure 16:
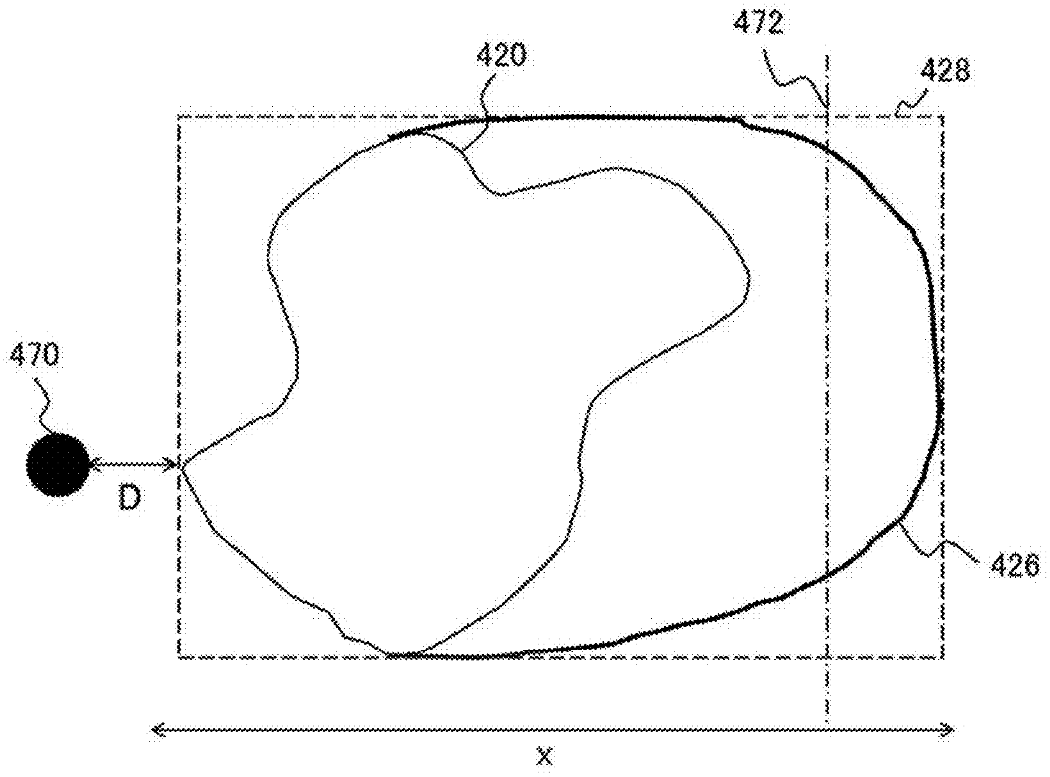
FIG. 16 is a diagram for explaining a policy of deciding a cut line when a user edits a play area from the outside of the play area in the present embodiment.

FIG. 16 is a diagram for explaining a policy of determining a cut line when a user edits a play area from the outside of the play area. As in FIG. 12, the user draws a boundary for the original play area 420, and the play area edition section 270 generates the circumscribing rectangle 428 for the new play area 426. In this example, however, it is assumed that the user is initially in a position 470 that is outside the play area 420. In this case, the play area edition section 270 determines a cut line 472 so as to trim the play area from a side opposite to the user position 470 with respect to the adjustment axis x.

That is, the play area edition section 270 inhibits a distance D from the user to the play area from being changed as a result of the trimming. Accordingly, a situation in which, as the user tries to expand the range of the play area to a direction opposite to the user, the whole play area is moved away from the user can be prevented.

Figure 17:
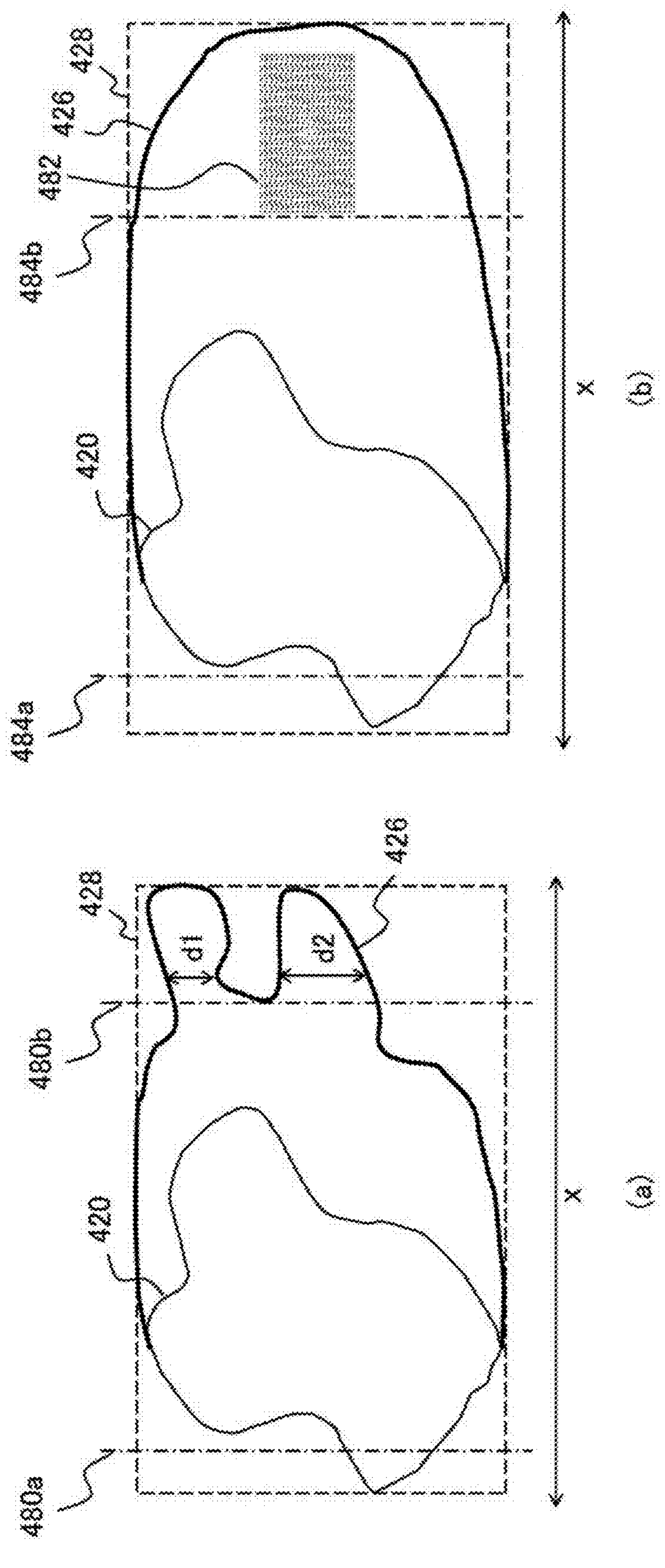
FIG. 17 is a diagram for explaining an aspect in which the play area edition section determines a cut line according to the shape of a play area and a real object that is present, in the present embodiment.

FIG. 17 is a diagram for explaining an aspect in which the play area edition section 270 determines a cut line according to the shape of a play area and a real object that is present. As in FIG. 12, (a) and (b) each indicate a state that a user draws a boundary for the original play area 420 and the play area edition section 270 generates the circumscribing rectangle 428 for the new play area 426. In (a), the play area edition section 270 determines cut lines 480*a* and 480*b* so as to preferentially remove a portion having a width smaller than a prescribed width in the new play area 426.

For example, the play area edition section 270 scans the boundary in the longitudinal and lateral directions of the circumscribing rectangle 428, and detects a portion where the distance (e.g. distances d1 and d2) between opposite boundaries is shorter than a threshold. Then, the cut line 480*b* for removing this portion is preferentially determined. Accordingly, a play area that is substantially insignificant because the user cannot pass through the play area is excluded. For this purpose, the threshold for the distance between opposite boundaries is approximately a human shoulder width, and is, for example, 30 to 40 cm.

In (b), when a real object 482 is inside the new play area 426, the play area edition section 270 determines cut lines 484*a* and 484*b* so as to remove a portion of the real object 482 preferentially. In this case, the play area edition section 270 detects the presence of the real object 482 that is at least partially included in the new play area 426, with reference to a map stored in the map storage section 258. Accordingly, a region that has a risk of a collision can be reliably removed, whereby a safe play area can be set.

It is to be noted that a portion to be preferentially removed exists in a region added by the user in each of (a) and (b), but, if a similar portion exists on the opposite side with respect to the adjustment axis x, the portion can be a target to be removed. In addition, when the case of (a) and the case of (b) occur at a time, both the portions may be regarded as targets to be removed. In at least one of these cases, a cut line may be determined, and another cut line is further determined, if needed, according to any one of the policies depicted in FIGS. 12, 15, and 16. In the depicted example, the user is assumed to be inside the play area, the cut lines 480*a* and 484*a* is further set on the opposite side with respect to the adjustment axis, whereby a portion of the play area in the direction to which the user desires to expand the play area is left as much as possible.

Figure 18:
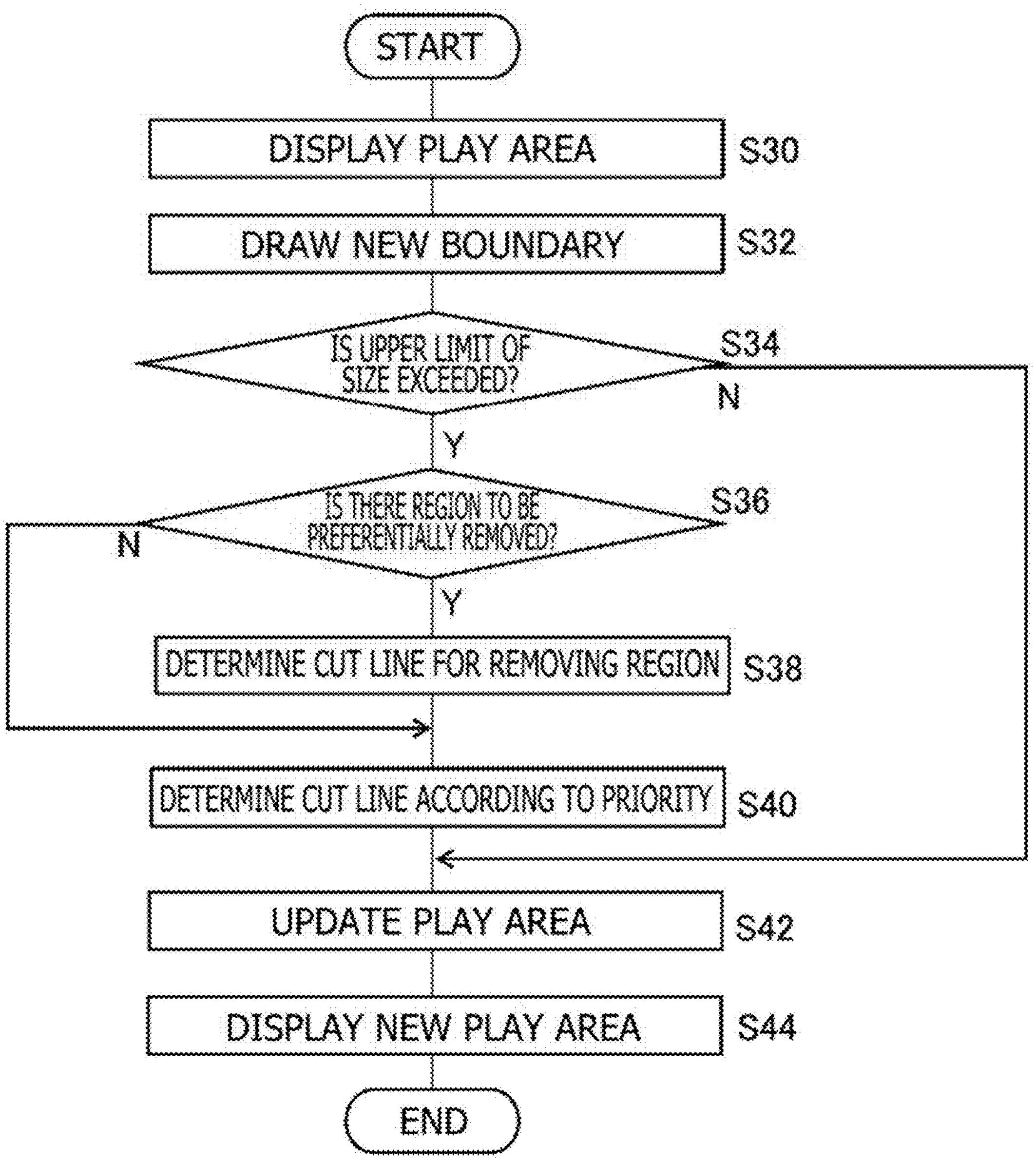
FIG. 18 is a flowchart of a processing procedure in which the play area edition section updates play area data according to a user's editing operation, in the present embodiment.

FIG. 18 is a flowchart of a processing procedure in which the play area edition section 270 updates play area data according to a user's editing operation. This process corresponds to S20 and S22 of the flowchart in FIG. 7. First, the play area edition section 270 expresses a play area detected by the play area detection section 266, in the form of an object such as that depicted in FIG. 9, and displays the object on the head mounted display 100 by, for example, superimposing the object on a camera image (S30).

When the user starts drawing a line on a floor with the controller 140, the play area edition section 270 detects the operation and renders an object representing a new boundary on the corresponding position (S32). For example, when the user changes a command direction of the controller 140 while depressing the trigger button, the play area edition section 270 moves an object of the controller cursor according to the change, and extends the movement path of the controller cursor. If the controller cursor comes out from the play area and comes back into the original play area and then the trigger button is released, the play area edition section 270 recognizes the current movement path as a new boundary.

Then, the play area edition section 270 determines whether or not the size of the new play area including the region added by the new boundary exceeds the upper limit (S34). Specifically, the play area edition section 270 generates a circumscribing rectangle for the new play area, and determines whether or not the length of each side of the circumscribing rectangle exceeds the upper limit. In a case where at least one of the sides exceeds the upper limit (Y in S34), the play area edition section 270 determines a cut line for the play area.

Specifically, the play area edition section 270 determines whether or not there is a region to be preferentially removed, according to the shape of the play area or the presence of a real object in the play area (S36), as depicted in FIG. 17. In a case where there is such a region (Y in S36), the play area edition section 270 sets a cut line for removing the region (S38). For example, the play area edition section 270 sets a cut line in a position distant, with respect to the adjustment axis, from a region having a width smaller than a threshold or a region where a real object is present.

It is to be noted that, in a case where a real object is present in the play area, the play area edition section 270 may set a cut line for removing the region, prior to confirmation of the size of the play area in S34. After the cut line is set in S38 or in a case where there is no region to be preferentially removed (N in S36), the play area edition section 270 sets cut lines in accordance with a predetermined priority order (S40). To determine the priority order, a choice can be made from among removing a portion preferentially from the new region added by the user as depicted in FIG. 12, removing a portion preferentially from the opposite region as depicted in (a) of FIG. 15, and removing a portion preferentially from a region distant from the user if the user is outside the play area as depicted in FIG. 16.

In a case where the user is inside the play area, a constraint condition that the distance between the cut line and the user with respect to the adjustment axis is set to be equal to or greater than a prescribed value as depicted in (b) of FIG. 15 is preferably provided. It is to be noted that, in a case where the size of the new play area is predicted to fall under the upper limit since the cut line for removing the region to be preferentially removed is determined in S38, processing of S40 can be omitted.

The play area edition section 270 trims the play area along the cut lines set in S38 and S40, and updates data regarding the original play area (S42). Also in a case where the size of the new play area does not exceed the upper limit in S34 (N in S34), the data is updated on the basis of the new play area (S42). Thereafter, the play area edition section 270 indicates the newly determined play area in the form of an object, and displays the object on the head mounted display 100 by, for example, superposing the object on a camera image (S44).

In a case where the cut line are set in S38 and S40 and the play area generated by the user operation is trimmed, the play area edition section 270 may display an image to specify the removed portion, as depicted in (b) of FIG. 13. Further, also at a stage where the user is drawing a boundary in S32, the user may be informed through an image or a sound if the size exceeds the upper limit.

According to the present embodiment explained so far, the image processing device automatically detects a play area in which a user wearing a head mounted display can safely move around, and receives a user's editing operation. The image processing device determines whether or not the size of the new generated play area falls under a predetermined upper limit, and adjusts the size of the play area to a proper value, if the size exceeds the upper limit, by automatically setting a proper cut line and performing trimming. Accordingly, a situation in which the user fails to grasp an effective size of a play area, fails to perform an edit, and has to perform edits many times can be prevented.

In addition, the image processing device trims a play area at a preferable position according to a direction in which the user desires to add a region or according to the position of the user. Accordingly, while a user's intention is taken into consideration, a play area for which a problem caused by an editing operation is unlikely to occur can be determined. Therefore, even if the user edits a play area relatively roughly and freely, it is highly possible that a proper play area is finally accepted. Thus, a psychological barrier to an editing operation can be reduced.

The present invention has been explained on the basis of the embodiment. The embodiment exemplifies the present invention, and a person skilled in the art will understand that various modifications can be made to a combination of the constituent elements or the process steps of the embodiment and that these modifications are also within the scope of the present invention.

INDUSTRIAL APPLICABILITY

As explained so far, the present invention is applicable to a variety of information processing devices including game devices, head mounted displays, and personal computers, or to systems including any one of the devices etc.

REFERENCE SIGNS LIST

100: Head mounted display
200: Image generation device
256: Play area storage section
264: Play area setting section
266: Play area detection section
268: Floor surface setting section
270: Play area edition section
274: Map generation section
280: Position estimation section
282: Alarm processing section
292: Display control section

The invention claimed is:

1. An information processing device comprising:

a storage section that stores data regarding a play area where a user wearing a head mounted display is able to move in a surrounding space around the user during a play of an application;

a display control section that displays, on the head mounted display, an image indicating the play area stored in the storage section; and a play area edition section that receives a user operation for editing the play area, detects an excess of an upper limit of a size of the play area, and performs size adjustment by removing a portion of the play area.

2. The information processing device according to claim 1, wherein, when a length of a side of a rectangle circumscribing the edited play area exceeds an upper limit, the play area edition section trims the edited play area along a cut line that is perpendicular to the side.

3. The information processing device according to claim 2, wherein, when the user is within the edited play area, the play area edition section sets the cut line to be positioned at a distance of a prescribed value or larger from the user with respect to an adjustment axis that is parallel with the side exceeding the upper limit.

4. The information processing device according to claim 3, wherein the play area edition section sets the cut lines in two positions on the adjustment axis.

5. The information processing device according to claim 2, wherein, when the user is outside the edited play area, the play area edition section removes a region, of the edited play area, on an opposite side to the user with respect to an adjustment axis that is parallel with the side exceeding the upper limit.

6. The information processing device according to claim 1, wherein the display control section displays an image indicating the trimmed play area on the head mounted display in such a way that the removed portion is specified.

7. The information processing device according to claim 6, wherein the display control section displays, on the head mounted display, an animation indicating how to remove a portion of the play area.

8. The information processing device according to claim 1, wherein, in a case where the user edits the play area, the display control section displays, on the head mounted display, a cursor that is able to be moved by the user and an object representing a movement path of the cursor so as to be superimposed on an image of a real space captured by a camera of the head mounted display, and the play area edition section receives the movement path as a new boundary for the play area, and, when a length of a side of a rectangular circumscribing a non-edited play area and the boundary exceeds an upper limit, the play area edition section reports the excess to the user.

9. The information processing device according to claim 1, wherein the play area edition section determines a region to be preferentially removed from the edited play area, on a basis of a shape of the edited play area and presence of a real object in the play area.

10. An information processing method comprising:

reading out, from a memory, data regarding a play area where a user wearing a head mounted display is able to move in a surrounding space around the user during a play of an application;

displaying an image indicating the play area on the head mounted display; and receiving a user operation for editing the play area, detecting an excess of an upper limit of a size of the play area, and performing size adjustment by removing a portion of the play area.

11. A non-transitory computer-readable medium storing executable instructions that, when executed by one or more processors, cause the one or more processors to at least:

reading out, from a memory, data regarding a play area where a user wearing a head mounted display is able to move in a surrounding space around the user during a play of an application;

displaying an image indicating the play area on the head mounted display; and receiving a user operation for editing the play area, detecting an excess of an upper limit of a size of the play area, and performing size adjustment by removing a portion of the play area.

* * * * *